(12) United States Patent
Lee

(10) Patent No.: US 8,615,709 B2
(45) Date of Patent: Dec. 24, 2013

(54) INITIATING FONT SUBSETS

(75) Inventor: Steve Hsing Lee, Tewksbury, MA (US)

(73) Assignee: Monotype Imaging Inc., Woburn, MA (US)

( * ) Notice: Subject to any disclaimer, the term of this patent is extended or adjusted under 35 U.S.C. 154(b) by 592 days.

(21) Appl. No.: 12/769,839

(22) Filed: Apr. 29, 2010

(65) Prior Publication Data

US 2011/0271180 A1 Nov. 3, 2011

(51) Int. Cl.
*G06F 17/00* (2006.01)

(52) U.S. Cl.
USPC ............................ 715/269; 715/234

(58) Field of Classification Search
USPC .................................. 715/234, 269
See application file for complete search history.

(56) References Cited

U.S. PATENT DOCUMENTS

| | | | |
|---|---|---|---|
| 4,244,657 A | 1/1981 | Wasylyk | |
| 5,347,266 A | 9/1994 | Bauman et al. | |
| 5,412,771 A | 5/1995 | Fenwick | |
| 5,416,898 A | 5/1995 | Opstad et al. | |
| 5,453,938 A | 9/1995 | Gohara et al. | |
| 5,526,477 A | 6/1996 | McConnell et al. | |
| 5,528,742 A | 6/1996 | Moore et al. | |
| 5,586,242 A | 12/1996 | McQueen et al. | |
| 5,737,599 A | 4/1998 | Rowe et al. | |
| 5,781,714 A | 7/1998 | Collins et al. | |
| 5,877,776 A | 3/1999 | Beaman et al. | |
| 5,940,581 A | 8/1999 | Lipton | |
| 6,031,549 A | 2/2000 | Hayes-Roth | |
| 6,065,008 A * | 5/2000 | Simon et al. | ............................ 1/1 |
| 6,141,002 A | 10/2000 | Kanungo et al. | |
| 6,249,908 B1 | 6/2001 | Stamm | |
| 6,252,671 B1 | 6/2001 | Peng et al. | |
| 6,313,920 B1 * | 11/2001 | Dresevic et al. | ............ 358/1.11 |
| 6,320,587 B1 | 11/2001 | Funyu | |
| 6,343,301 B1 | 1/2002 | Halt et al. | |
| 6,490,051 B1 | 12/2002 | Nguyen et al. | |
| 6,522,330 B2 | 2/2003 | Kobayashi | |
| 6,583,789 B1 | 6/2003 | Carlson et al. | |
| 6,675,358 B1 | 1/2004 | Kido | |
| 6,678,688 B1 | 1/2004 | Unruh | |
| 6,704,116 B1 | 3/2004 | Abulhab | |

(Continued)

FOREIGN PATENT DOCUMENTS

| | | |
|---|---|---|
| JP | 2002-507289 | 3/2002 |
| WO | WO 94/23379 | 10/1994 |

(Continued)

OTHER PUBLICATIONS

"Announcing Speakeasy: A new open-source language tool from Typekit," Oct. 28, 2010, on-line http://blog.typekit.com/2010/10/28/announcing-speakeasy-a-new-open-source-language-tool-from-typekit/.

(Continued)

*Primary Examiner* — Adam M Queler
(74) *Attorney, Agent, or Firm* — Fish & Richardson P.C.

(57) ABSTRACT

A computer-implemented method includes analyzing content of a received electronic document in an autonomous manner to identify each unique character of one or more fonts included in the content of the electronic document. The method also includes initiating a request for a subset of one or more of the fonts included in the content of the electronic document, wherein the request includes each identified unique character of the respective one or more fonts.

45 Claims, 9 Drawing Sheets

(56) References Cited

U.S. PATENT DOCUMENTS

| | | | |
|---|---|---|---|
| 6,704,648 B1 | 3/2004 | Naik et al. | |
| 6,718,519 B1 | 4/2004 | Taieb | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,856,317 B2 | 2/2005 | Konsella et al. | |
| 6,901,427 B2 | 5/2005 | Teshima | |
| 6,952,210 B1 | 10/2005 | Renner et al. | |
| 6,993,538 B2 | 1/2006 | Gray | |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 * | 12/2006 | Adler et al. | 715/210 |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,477,988 B2 | 1/2009 | Dorum | |
| 7,492,365 B2 | 2/2009 | Corbin et al. | |
| 7,505,040 B2 | 3/2009 | Stamm et al. | |
| 7,552,008 B2 | 6/2009 | Newstrom et al. | |
| 7,580,038 B2 | 8/2009 | Chik et al. | |
| 7,636,885 B2 | 12/2009 | Merz et al. | |
| 7,768,513 B2 | 8/2010 | Klassen | |
| 7,836,094 B2 * | 11/2010 | Ornstein et al. | 707/803 |
| 7,882,432 B2 | 2/2011 | Nishikawa et al. | |
| 7,944,447 B2 | 5/2011 | Clegg et al. | |
| 8,098,250 B2 | 1/2012 | Clegg et al. | |
| 8,201,088 B2 | 6/2012 | Levantovsky et al. | |
| 2001/0052901 A1 | 12/2001 | Kawabata et al. | |
| 2002/0010725 A1 | 1/2002 | Mo | |
| 2002/0087702 A1 | 7/2002 | Mori | |
| 2002/0093506 A1 | 7/2002 | Hobson | |
| 2003/0014545 A1 * | 1/2003 | Broussard et al. | 709/250 |
| 2004/0025118 A1 | 2/2004 | Renner | |
| 2004/0088657 A1 | 5/2004 | Brown et al. | |
| 2004/0119714 A1 | 6/2004 | Everett et al. | |
| 2004/0177056 A1 | 9/2004 | Davis et al. | |
| 2004/0207627 A1 | 10/2004 | Konsella et al. | |
| 2005/0111045 A1 | 5/2005 | Imai | |
| 2005/0190186 A1 * | 9/2005 | Klassen | 345/467 |
| 2005/0200871 A1 | 9/2005 | Miyata | |
| 2005/0275656 A1 | 12/2005 | Corbin et al. | |
| 2006/0010371 A1 * | 1/2006 | Shur et al. | 715/513 |
| 2006/0017731 A1 | 1/2006 | Matskewich et al. | |
| 2006/0072136 A1 | 4/2006 | Hodder et al. | |
| 2006/0072137 A1 | 4/2006 | Nishikawa et al. | |
| 2006/0103653 A1 | 5/2006 | Chik et al. | |
| 2006/0103654 A1 | 5/2006 | Chik et al. | |
| 2006/0168639 A1 | 7/2006 | Gan | |
| 2006/0245727 A1 | 11/2006 | Nakano et al. | |
| 2006/0267986 A1 * | 11/2006 | Bae et al. | 345/467 |
| 2006/0285138 A1 | 12/2006 | Merz et al. | |
| 2007/0006076 A1 * | 1/2007 | Cheng | 715/542 |
| 2007/0139413 A1 | 6/2007 | Stamm et al. | |
| 2007/0159646 A1 * | 7/2007 | Adelberg et al. | 358/1.11 |
| 2007/0211062 A1 | 9/2007 | Engelman et al. | |
| 2007/0283047 A1 | 12/2007 | Theis et al. | |
| 2008/0028304 A1 | 1/2008 | Levantovsky et al. | |
| 2008/0030502 A1 | 2/2008 | Chapman | |
| 2008/0282186 A1 | 11/2008 | Basavaraju | |
| 2009/0303241 A1 * | 12/2009 | Priyadarshi et al. | 345/471 |
| 2009/0307585 A1 * | 12/2009 | Tranchant et al. | 715/269 |
| 2010/0088694 A1 | 4/2010 | Peng | |
| 2010/0231598 A1 | 9/2010 | Hernandez et al. | |
| 2010/0321393 A1 | 12/2010 | Levantovsky | |
| 2011/0090229 A1 * | 4/2011 | Bacus et al. | 345/467 |
| 2011/0090230 A1 | 4/2011 | Bacus et al. | |
| 2011/0093565 A1 | 4/2011 | Bacus et al. | |
| 2011/0115797 A1 * | 5/2011 | Kaplan | 345/467 |
| 2011/0238495 A1 | 9/2011 | Kang | |
| 2011/0271180 A1 * | 11/2011 | Lee | 715/269 |
| 2012/0001922 A1 * | 1/2012 | Escher et al. | 345/467 |
| 2012/0092345 A1 * | 4/2012 | Joshi et al. | 345/471 |
| 2012/0102176 A1 | 4/2012 | Lee et al. | |
| 2012/0102391 A1 | 4/2012 | Lee et al. | |
| 2012/0215640 A1 | 8/2012 | Ramer et al. | |

FOREIGN PATENT DOCUMENTS

| | | |
|---|---|---|
| WO | WO 99/00747 | 1/1999 |
| WO | WO 01/91088 | 11/2001 |
| WO | WO 2004/012099 | 2/2004 |
| WO | WO 2005/001675 | 1/2005 |

OTHER PUBLICATIONS

International Search Report & Written Opinion issued in PCT application No. PCT/US2011/034050 dated Jul. 15, 2011, 13 pages.

International Search Report & Written Opinion issued in PCT application No. PCT/US10/01272, mailed Jun. 15, 2010, 6 pages.

Adobe Systems Incorporated, "The Type 42 Font Format Specification," Technical Note #5012, Jul. 31, 1998, pp. 1-24.

Adobe Systems Incorporated, "PostScript Language Reference—Third Edition," Feb. 1999, pp. 313-390.

Adobe Systems Incorporated, "To Unicode Mapping File Tutorial," Adobe Technical Note, XP002348387, May 2003.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

Japanese Office Action, 2009-521768, mailed Aug. 28, 2012.

Supplementary European Search Report, European Patent Office, European patent application No. EP 07796924, dated Dec. 27, 2010, 8 pages.

TrueType Fundamentals, Microsoft Typography, Nov. 1997, pp. 1-17.

International Search Report & Written Opinion, PCT/US2013/026051, mailed Jun. 5, 2013, 9 pages.

* cited by examiner

```
$.each(projectSelectorList, function(selector, font){
    var $val = $(selector);

elementCache.push($val.css({'visibility':'hidden'}));
    //if dynamicsubsetting is required extract text from the
selected elements
    if(requiredDynamicSubsetting)
    {
        //accumulate the text for specific font
        if(queryFontList[font])
            queryFontList[font] += $val.text();
        else
            queryFontList[font] = $val.text();
    }
});
```

```
$('*', $body).filter(function(){
    var $this = $(this);
    var hasProjectFont = false;
    var fontFamily = $this.css('font-family');

$.each(projectFontList, function(i, fontName){
        if(fontFamily.replace(/^\s|\s$/g,'') == fontName.replace(/^\s|\s$/g,''))
        {
            // if the current element is not in element cache
            if($.inarray($this, elementCache) < 0)
            {
                elementCache.push($this.css({'visibility':'hidden'}));
                if(requiredDynamicSubsetting)
                {
                    if(queryFontList[fontFamily])
                    {
                        queryFontList[fontFamily]+= $this.text();
                    }
                    else
                    {
                        queryFontList[fontFamily]= $this.text();
                    }
                }
                hasProjectFont = true;
            }
        }
    });
    return hasProjectFont;
});

function extractUniqueChars(node, ignoreWhiteSpace) {
    var text = extractText(node, ignoreWhiteSpace);
    var uniq = "";
    var textLength = text.length;
    var curChar = null;
    var charAt = text.charAt;
    for (var i = 0; i < textLength; i++) {
        curChar = text.charAt(i);
        if (uniq.indexOf(curChar) == -1) {
            uniq += curChar;
        }
    }
    return uniq;
}
```

```
if(requiredDynamicSubsetting)
{
    $.each(queryFontList, function(i, fontName){
        //Mention which font uses what characters, to server
        queryString += '&' + fontName + '=' +
        escape($.extractUniqueChars(val));
    });
    MTI_WFSurl += queryString + 'g';

head.append('<link rel=""stylesheet"" type=""text/css""
                  href=""'+MTI_WFSurl+'"" />');
}
```

INITIATING FONT SUBSETS

BACKGROUND

This description relates to initiating the production and delivery of font subsets.

In the ever-expanding connectivity provided by computer networks such as the Internet, various types of content such as text, graphics, audio, video, etc. may be exchanged between a few computing devices or broadcast to a multitude. Due to such connectivity, users located throughout various regions of the globe may access content providers who need the flexibility of providing content to users of different nationalities and cultures. For example, content provided to North American users may not be discernable to Asian users. As such, providers may tailor content for users in particular geographical regions or provide adjustable content to different users.

SUMMARY

The systems and techniques described here relate to producing and delivering font subsets.

In one aspect, a computer-implemented method includes analyzing content of a received electronic document in an autonomous manner to identify each unique character of one or more fonts included in the content of the electronic document. The method also includes initiating a request for a subset of one or more of the fonts included in the content of the electronic document, wherein the request includes each identified unique character of the respective one or more fonts.

Implementations may include any or all of the following features. Analyzing the content of the electronic document may include identifying a source of a font or the absence of a source included of a font in the one or more fonts. Analyzing content of a received electronic document in an autonomous manner may be initiated by executing an agent. Analyzing content of the received electronic document may include parsing the content of the electronic document to identify the characters represented in the document. Analyzing content of the received electronic document may include filtering the identified characters represented in the electronic document to identify each unique character for each of the one or more fonts included in the content of the electronic document. Initiating a request for a subset for one or more of the fonts may include adding the identified characters to a request. A response to the request may include all characters of one or more of the fonts. Analyzing the content of the electronic document may be performed independent of platform.

In another aspect a system includes a font server for providing to a computing device, upon request, an agent for analyzing content of an electronic document received by the computing device. The analysis performed by the agent identifies each unique character of one or more fonts included in the content of the electronic document. The font server is configured to produce, upon request from the computing device, a subset for one or more of the fonts in which each font subset includes each identified unique character of the respective font. The font server is further configured to initiate sending each font subset to the computing device.

Implementations may include any or all of the following features. Analyzing the content of the received electronic document, the agent may identify a source of a font or the absence of a source of a font included in the one or more fonts. The computing device may execute the agent received from the font server to analyze the content of the received electronic document. The agent may parse the content of the electronic document to identify the characters represented in the document. The agent may filter the identified characters represented in the document to identify each unique character for each of the one or more fonts included in the content of the electronic document. The agent may initiate production of the request for the font server. The agent may be configured to operate independent of the computing device type. The font server may be configured to determine the portion of font characters to include in the font subset, and the portion of the font characters to include in the font subset may include all characters of the font. The font server may associate the produced font subset to the received electronic document.

In another aspect a computing device includes a memory configured to store instructions and a processor configured to execute the instructions to perform a method. The method includes analyzing content of a received electronic document in an autonomous manner to identify each unique character of one or more fonts included in the content of the electronic document. The method also includes initiating a request for a subset of one or more of the fonts included in the content of the electronic document. The request includes each identified unique character of the respective one or more fonts.

Implementations may include any or all of the following features. Analyzing the content of the electronic document may include identifying a source of a font or the absence of a source of a font included in the one or more fonts. Analyzing content of a received electronic document in an autonomous manner may be initiated by executing an agent. Analyzing content of the received electronic document may include parsing the content of the electronic document to identify the characters represented in the document. Analyzing content of the received electronic document may include filtering the identified characters represented in the electronic document to identify each unique character for each of the one or more fonts included in the content of the electronic document. Initiating a request for a subset of one or more of the fonts includes adding the identified characters to a request.

In another aspect, one or more computer readable media storing instructions that are executable by a processing device, and upon such execution cause the processing device to perform operations that include analyzing content of a received electronic document in an autonomous manner to identify each unique character of one or more fonts included in the content of the electronic document. The operations also include initiating a request for a subset of one or more of the fonts included in the content of the electronic document. The request includes each identified unique character of the respective one or more fonts.

Implementations may include any or all of the following features. Analyzing the content of the electronic document may include identifying a source of a font or the absence of a source of a font included in the one or more fonts. Analyzing content of a received electronic document in an autonomous manner may be initiated by executing an agent.

These and other aspects and features and various combinations of them may be expressed as methods, apparatus, systems, means for performing functions, program products, and in other ways.

Other features and advantages will be apparent from the description and the claims.

DESCRIPTION OF DRAWINGS

FIGS. 5, 6 and 7 illustrate examples of code instructions.

DETAILED DESCRIPTION

Figure 1:
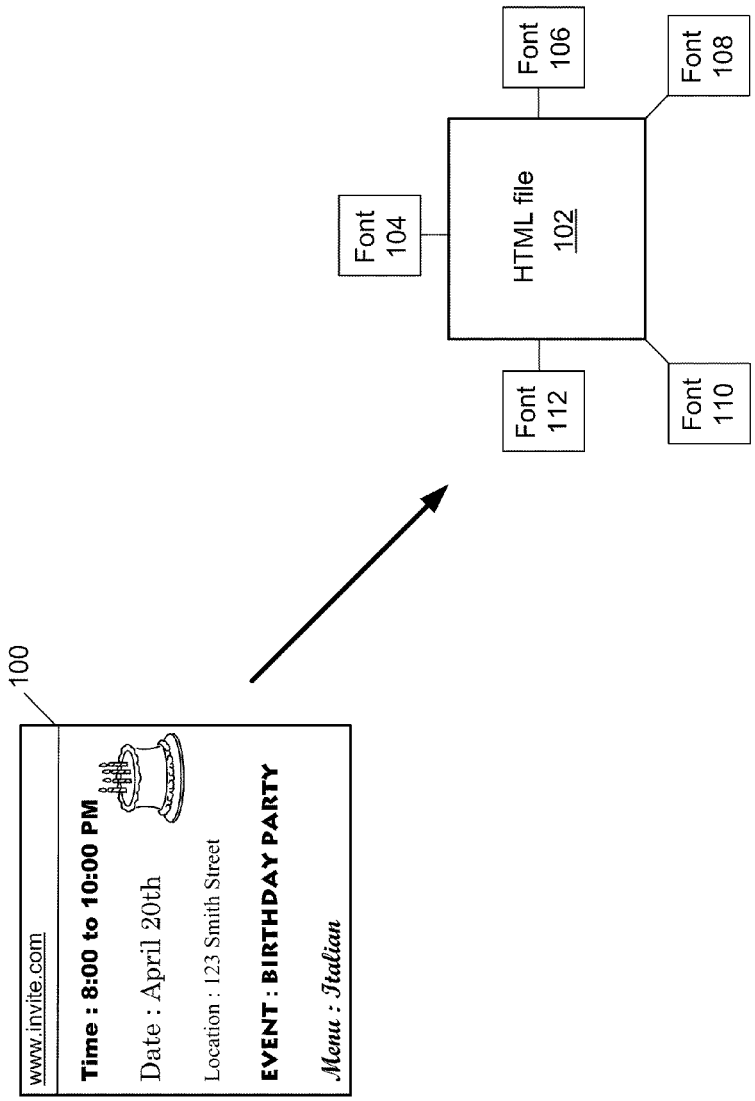
FIG. 1 illustrates exemplary content that may be transferred through a computer network.

Referring to FIG. 1, an exemplary webpage 100 is illustrated that may be accessed through the Internet (or other type of computer network) by a user of a computing device (e.g., computer system, personal digital assistant (PDA), cellular telephone etc.). For example, by providing an appropriate uniform resource locator (URL) to a web browser, the webpage may be accessed, packaged and sent from a corresponding content provider to the user's computing device for display. In the illustrated example, the content of the web page 100 is a birthday party invitation that includes text and graphics and may be accessed from a particular URL (i.e., www.invite.com). To provide an eye-catching invitation, multiple fonts are used that provide different typefaces, each of which can be considered as providing stylistic characters or glyphs. A "character" can be considered as a member of a set of shapes used for the organization, control and representation of information, and, a "glyph" can be considered as a specific instance of a character.

Once accessed, a content provider may use one or more techniques to provide the content of the webpage 100 to the user's computing device. For example, the webpage 100 may be represented in one or more files (e.g., file 102) that use a markup language such as hypertext markup language (HTML) so that the webpage 100 conforms to the browser executed by the computing device. Standards such as the World Wide Web Consortium (W3C) standards for HTML, CSS, XML and other standards may be implemented by the browser so the webpage 100 can be properly rendered on various types of platforms capable of displaying electronic content (e.g. personal computers, wireless telephones, personal digital assistants, handheld computers, set-top boxes and Internet appliances, etc.).

Along with providing graphics (e.g., a graphic of a birthday cake in this instance), the one or more HTML files may reference one or more fonts used to render text on the webpage. For illustration, five different fonts are used in the webpage 100 to provide information associated with the invitation (e.g., time, date, location, event description, and menu). As such, the HTML file 102 calls out each font such that the recipient computing device is aware which font corresponds to each portion of textual information (e.g., present the date in a Times New Roman font). Upon receiving and executing the instructions included in the HTML file 102, the recipient computer device may locally retrieve the fonts needed to present the text. However, a considerable amount of computing devices are unable to locally store all the characters of each font that could be needed to render the webpage. Limited resources (e.g., memory) and the constant creation of new font types can limit each type of computing device from being ready to display text in any and all fonts. Fonts associated with different languages amplifies the issue that many computing devices are unable to provide all font types. Languages such as Chinese, Japanese, Korean, etc. use alphabets of characters that may number in the tens of thousands (e.g., over 10,000 characters) and call for 1 MB to 20 MB of memory to store the characters of a single language. Such memory needs are impractical, specially for computing devices with less robust onboard memory (e.g., cellular telephones). Further, storing complete character sets for even a few fonts may be inefficient if only a few characters are need from a set (to present a particular webpage). Referring to the illustrated example, a relatively small number of Times New Roman font characters are needed to present the event date (e.g., "A", "p", "r", "i", "1", "2", "0", "t" and "h") and storing the complete font character set may be considered an unwise use of device memory, certainly if a complete character set is stored for each possible user language (e.g., English, Chinese, Japanese, etc.).

To conserve the use of local memory, some conventional techniques provide complete font sets with the received webpage content (e.g., an HTML file) or initiate the retrieval of the complete character sets of needed fonts upon receipt of the file associated with the webpage. However, such techniques may still cause computing device memory to be filled with collections of font characters when only a few characters are actually being used by the webpage. For example, as illustrated in the figure, to present the webpage 100 on a computing device, complete font character sets 104, 106, 108, 110, 112 are provided along with the HTML file 102. As such, each possible character of the five fonts used by the webpage 100 is provided to the computing device, thereby consuming a considerable amount of memory of the computing device.

The time needed for transferring fonts along with bandwidth consumption also provides a concern. For example, transferring complete character sets of fonts associated with languages such as Chinese, Japanese and Korean may need considerable bandwidth and transfer time.

One or more techniques may be used to reduce the file transfer time, bandwidth consumption and needed memory space for preparing to present webpages such as webpage 100. For example, rather than providing complete character sets for each font, font subsets may be provided that include only the characters that appear in the webpage. As such, file transfer time and bandwidth needs are reduced and device memory is conserved while an appropriate set of font characters is provided for webpage presentation. Referring to the illustrated example, each of the font character sets 104-112 may be replaced with significantly smaller font subsets that can be provided with the HTML file 102 or relatively soon after receipt of the file. Similar to reducing transfer time and bandwidth needs based on font subsets for the stylistic appearance of characters, reductions may also be achieved for providing font subsets associated with different languages. For example, if a webpage contains only three hundred Chinese characters, it may be more efficient to provide a font subset that is restricted to only include the three hundred characters, which may reduce the size of the transferred font data from approximately 10 MB to 50 KB. In some situations while subsets may be produced for some font character sets (e.g., the Chinese language character set), other font character sets may be sent as complete sets. For example, due to the relatively small number of characters included in a complete font set (e.g., the Latin language character set), creating and transferring a subset may not significantly reduce the bandwidth or time needed to transfer the entire character set. Along with reducing the size of font character sets provided to a computing device to present a webpage or other types of electronic document, one or more techniques may be implemented to efficiently provide such font subsets to computing devices. For example, along with presenting the webpage, the user's computing device may be used for identifying the appropriate font subsets and subsequently request the identified subsets.

Figure 2:
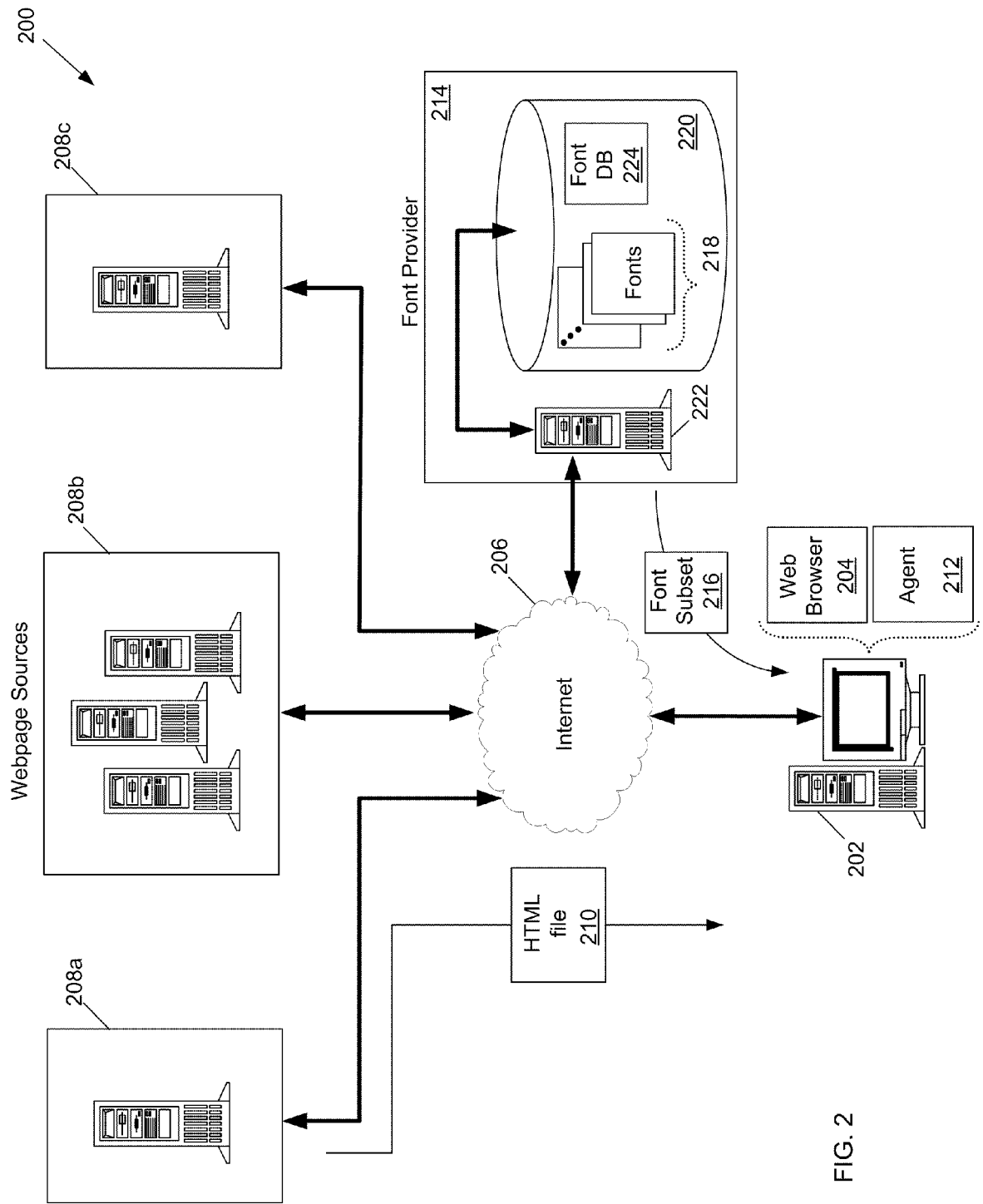
FIG. 2 is a block diagram an Internet based computer network.

Referring to FIG. 2, a computer network 200 includes a computer system 202 that a user may interact with (e.g., using a keyboard or pointing device such as a mouse) identify a target webpage to be presented with the computer system. For example, a web browser 204 or similar software application may be executed by the computer system 202 for the user to target one or more webpages. Upon being identified, operations of the web browser 204 may include requesting, via the Internet 206, content from one or more webpage sources 208 a,b,c for the target webpage(s). As illustrated, in this particular example a webpage page is requested from webpage source 208a and a corresponding HTML file 210 is sent from the source through the Internet 206 to the computer system 202.

To identify the appropriate font subsets to present the webpage defined by the HTML file 210, the computer system 202 may use one or more techniques. For example, operations may be executed by the computer system 202 to scan the HTML file 210 to identify the individual font characters included in the webpage defined by the file. In one arrangement, the computer system 202 may execute a software agent 212 to identify the individual font characters and to send a request to initiate the production of font subsets (if appropriate) needed to present the webpage. Such agents can be considered as a software module that is executable in a substantially autonomous manner. For example, upon being provided to the computer system 202, a software agent may operate without considerable user interaction. By operating in a somewhat flexible manner, the software agent can adaptively identify font characters needed for webpage presentation. In this particular example, the software agent 212 scans the content of the HTML file 210 in a somewhat persistent manner for identifying the font characters. For example, the software agent may execute in a substantially continuous manner. In some arrangements the software agent is provided to the user computing device (e.g., computer system 202) very shortly after the delivery of the file or files (e.g., the HTML file 210). As such, electronic documents such as webpages, application pages, user interfaces, and the like may be perceived as being scanned nearly in real time as the documents are received.

The computer network 200 also includes a font provider 214 that determines to produce font subsets (when appropriate) based upon information provided by software agents (e.g., software agent 212) executed by user computing devices (e.g., computer system 202). Once produced, the subset or subsets (e.g., illustrated as font subset 216) are packaged and sent by the font provider 214 to the requesting computing device. Along with determining to produce one or more font subsets, the font provider 214 is also capable of determining if complete font character sets should be provided to the requesting computing device. For example, predefined rules may be used by the font provider 214 in determining whether a font subset should be sent. One such rule may indicate that font character sets associated particular languages (e.g., Chinese) should have subsets created due to the large size of the complete character set. Subset determinations may also be provided in a dynamic manner. For example, based upon achievable file transfer rates, a file size threshold (e.g., 2 MB) may be determined such that subsets are produced for character sets larger than the threshold. If a font character set size falls below the threshold, the entire character set may be sent as the file transfer rate may be considered within an efficient range. Such thresholds may be dynamically adjusted, for example, by monitoring the achievable transfer rates, the threshold may be changed. For example, as the level of achievable transfer rates decreases, the threshold for creating subsets for character sets may correspondingly be decreased (e.g., lowered from 2 MB to 1 MB). One or more factors may account for determining the transfer rates as being within an efficient range. For example, geographic location of the user computing device and the font provider may factor into whether a subset should be produced and sent in place of a complete character set. If both the font provider and the user computing device are located relatively nearby (e.g., both in the eastern United States), relatively high transfer rates may be achievable and the entire character set may be sent. For a situation in which the user computing device is remote from the font provider (e.g., one in the United States and the other in India), the font provider may determine to subset the font character set to be sent. Similar to location based determinations, time of day, season of year and other temporal factors may be used by the font provider to determine if subsets need to be produced for one or more font character sets identified for transmission.

In some arrangements, the font provider 214 may also provide the software agents to the computing devices for scanning received files (e.g., HTML file 210) for character identification. As such, the font provider 214 may operate independent of the webpage sources 208 a,b,c. Once a request is received from a user computing device, the font provider 214 may provide appropriate agent software to the requesting device. Once the electronic document is scanned by the software agent, appropriate fonts and font subsets may be provided by the font provided 214 based upon a request initiated by the executed agent.

To provide the fonts and font subsets, the font provider 214 typically needs access to one or more libraries of fonts that may be stored local or remote to the font provider. As represented in the figure, a library of fonts 218 is shown being stored in a storage device 220 (e.g., one or more hard drives, CD-ROMs, etc.) on site. Being accessible by a server 222, the font library 218 may be used along with information provided from software agents to produce appropriate font subsets that can be provided along with complete font character sets (if determined appropriate by the font provider). Illustrated as being stored in a single storage device 220, the font provider 214 may use numerous storage techniques and devices to retain a collection of accessible sets of fonts (e.g., for different font styles, languages, etc.). The font provider 214 may also access fonts at separate locations for subset production. For example, upon identifying characters needed for a font subset, the server 222 may be used to collect needed characters from one or more sources external to the font provider 214 (e.g., via the Internet 206).

Along with producing font subsets and providing them (along with complete font sets, if appropriate) to requesting computing devices, the font provider 214 may provide other functionality. For example, fonts and font subsets associated with particular webpages may be tracked for future requests. In one scenario, one or more font subsets (e.g., font subset 216) may be created for presenting a particular webpage (on a computing device). The association between the font subsets and the webpage may be identified (e.g., by the server 222) and stored for later retrieval. As such, the subsets needed to present the webpage in the future (e.g., on another computing device) can be quickly identified and provided to the requesting computing device. In one arrangement, a font database 224 is stored at the font provider 214 (e.g., on the storage device 220) and includes records that represent the association between webpages and font subsets (and fonts). In some instances, the association is identified from information provided by font subset requests sent to the font provider 214 (e.g., from a software agent). The association between a webpage and appropriate font subsets may also be stored prior to the webpage being selected by a user (e.g., based on directions and information provided by a webpage source). Other types of architectures and networking techniques may also be implemented for providing software agents and font subsets (and fonts) to user computing devices for presentation of electronic documents such as webpages. Other types of architectures and networking techniques may also be implemented for providing software agents and font subsets (and fonts) to user computing devices for presentation of electronic documents such as webpages.

Figure 3:
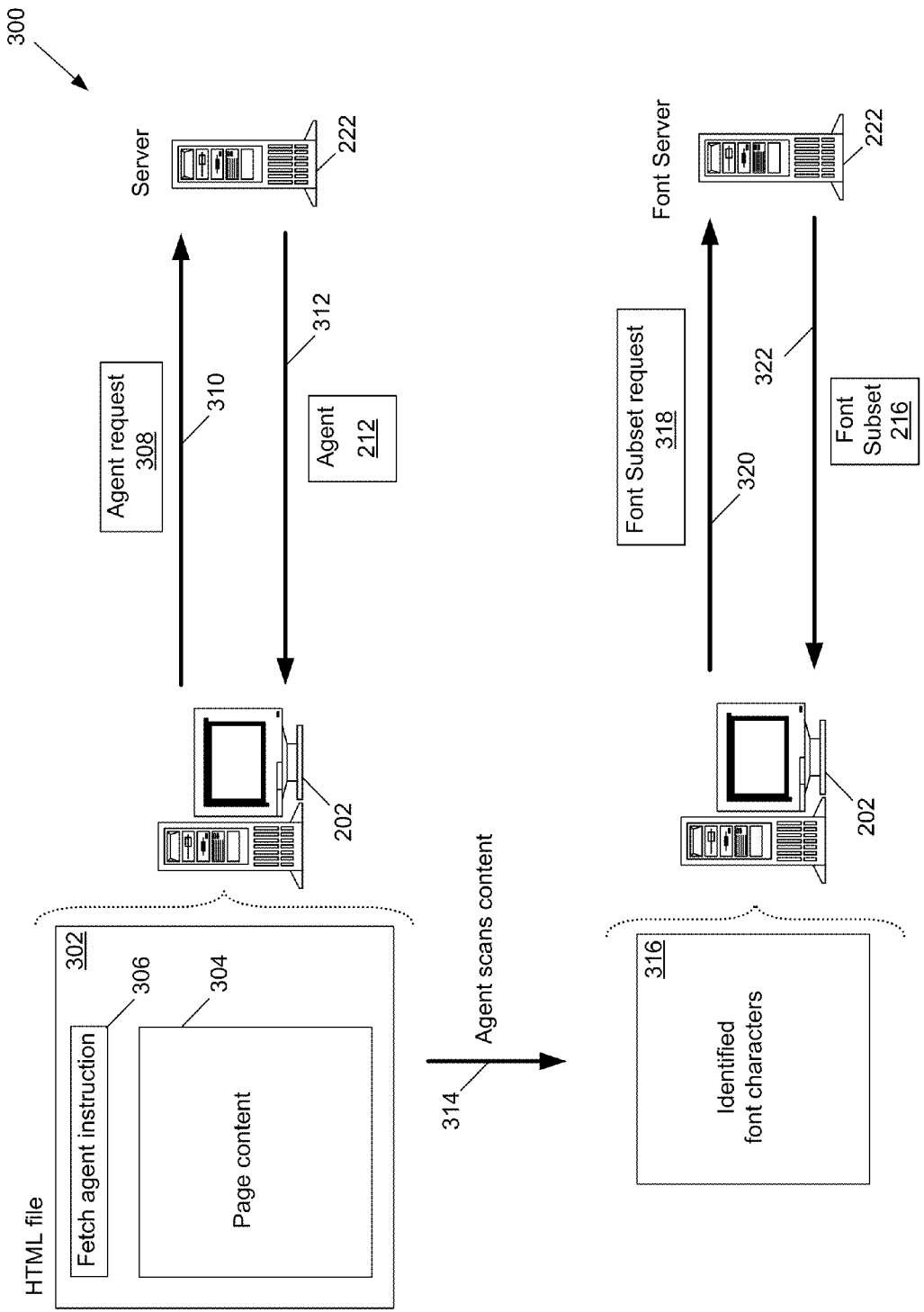
FIG. 3 illustrates requesting and delivering a software agent and a font subset from a front provider.

Referring to FIG. 3, a diagram 300 represents some operations for providing a software agent to a user's computing device along with appropriate font subsets (and fonts) needed to present a webpage of other type of electronic document. As illustrated in FIG. 2, upon a user identifying a webpage of interest with a web browser executed on a computing device (e.g., providing a URL to the web browser), one or more files (e.g., HTML files) may be provided to the user's computing device from a corresponding webpage source. As illustrated, such a file 302 may include content 304 (e.g., text, graphics, video, audio, etc.) for presenting to the user (via the web browser). The file 302 may also contain one or more instructions 306 for requesting that a software agent be provided to the user's computing device 202. Upon executing the instructions (labeled in the figure "Fetch agent instruction"), delivery of a request 308 may be initiated from the user computing device (e.g., the computer system 202) to the font provider 214 (e.g., server 222), as represented by graphical arrow 310. In response to the request 308, an agent (e.g., the agent 212) is sent from the server 222 of the font provider 214 to the user computing device (e.g., computer system 202), as represented by graphical arrow 312. In some instances the delivery of the agent may occur very soon after the file is received and any delay may go unnoticed by a user. In some arrangements, other information may be provided by the request 308. For example, the webpage of interest may be identified in the request (e.g., URL of the webpage provided) so that the font provider 214 may determine if a one or more font subsets (and possibly fonts) have been previously produced for the webpage.

Received at the user computing device, the requested agent 212 is executed to scan the content 304 of the HTML file 302 (as represented by a graphical arrow 314) to identify characters for each font represented in the content. The agent 212 may also provide the functionality to identify each unique character of each font present. As such, multiple instances of the same font character may only be noted once by the agent, thereby consolidating the characters needed to be requested from the font provider 214 (for each received electronic document). In some arrangements, the agent 212 notifies the font provider 214 of each character identified for each font present in the webpage. Upon being provided this information, the font provider identifies each uniquely occurring character for each font for possible inclusion in a font subset. To provide such scanning operations, one or more techniques may be implemented, for example, the agent may parse the content 304 to identify each character present for each font. One or more filters may then be used (by the agent 212 or the font provider 214) to identify each unique character for each font. For example, if the characters "a", "B", and "c" for font A are detected in the content 304 and characters "x", "Y", and "Z" for font B are detected, the agent may identify a subset for font A as containing "a", "B" and "c" while the subset for font B may contain "x", "Y" and "Z". Once scanned, identified font characters 316 are used by the agent 212 to produce a font subset request 318. In general, the request 318 includes each character identified by the agent 212, however, some characters included in the content of the page content 304 may not be included in the request 318. For example, characters identified as possibly being locally stored at the user computing device may not be included in the request 318. As such, the agent 212 may exclude some characters included in the page content 304 from the subset request 318.

One or more techniques may be implemented to provide the font subset request 318 to the server 222 of the font provider 214, as represented by graphical arrow 320. For example, for an agent represented in JavaScript, a technique associated with a protocol such as the hypertext transfer protocol (HTTP) maybe used for transferring the request. By appending the identified unique characters to a query string of the URL of interest, a command (e.g., a GET command) can be used to provide the information to the server 222. Similarly, an agent that is provided as an application may provide the character information to the server 222 of the font provider 214 with a protocol such as HTTP. Once provided the request 318 for the font subset(s), the server 222 produces the one or more needed font subsets and complete font character sets (if appropriate) and replies to the user computing device. For example, as represented with graphical arrow 322, the font subset 216 (that may represent one or more font subsets and possibly one or more complete font character sets) is provided to the user computing device.

Figure 4:
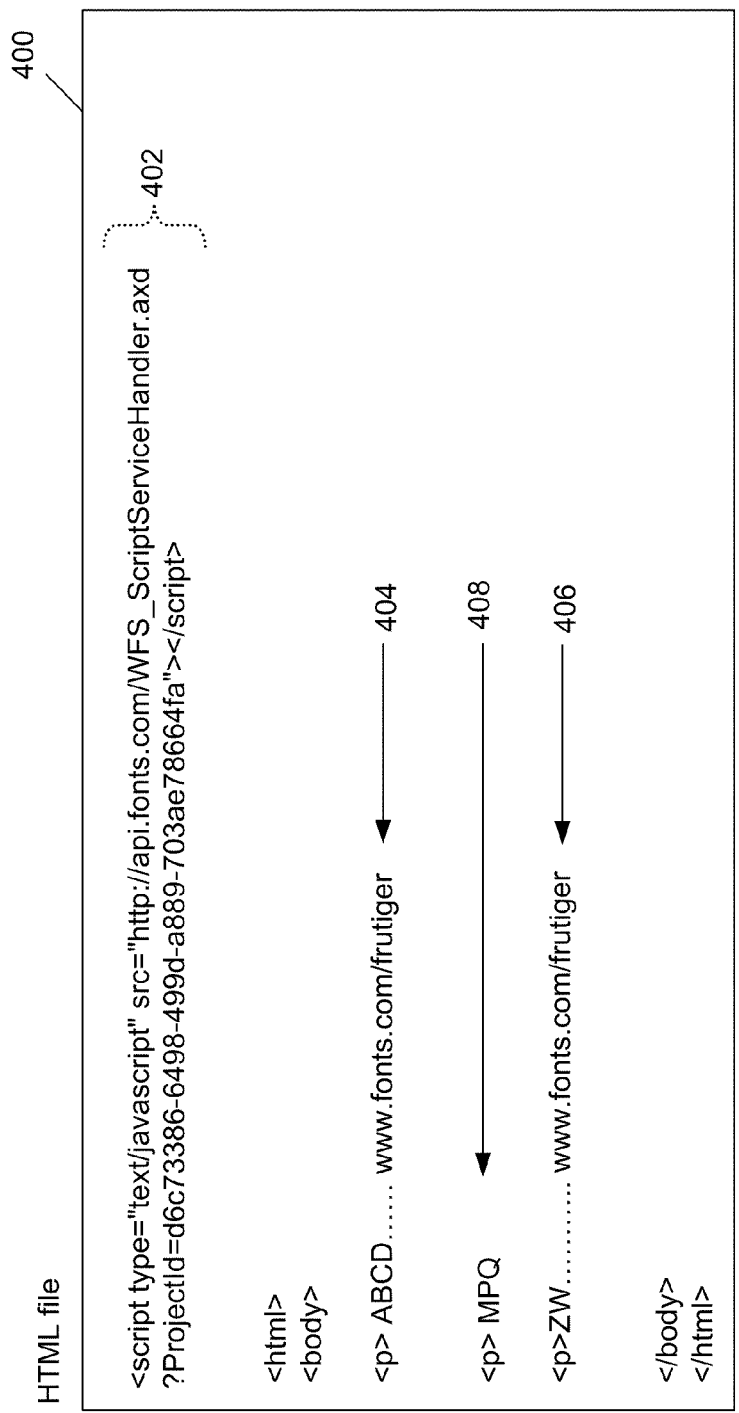
FIG. 4 is an exemplary file for producing a webpage.

Referring to FIG. 4, instructions of an exemplary HTML file 400 are illustrated that include requesting an agent (such as the agent 212 shown in FIG. 2) and assigning fonts to particular characters. In this particular example, upon instruction 402 being executed (e.g., by the computer system 202), an agent is requested from a font provider (e.g., the font provider 214). Once received by the computer system 202, the agent is executed to analyze the contents of the HTML file 400. For example, the agent may step through each of the remaining lines of the HTML file 400 and identify each character and font used to present the webpage associated with the contents of the file. For example, by analyzing instruction 404, the agent may identify that characters "A", "B", "C" and "D" in frutiger font are needed for webpage production. In this particular arrangement, the individual characters (e.g., "A B C D") are provided by the instruction 404 along with a URL for accessing the font. Similarly, the executed agent also identifies, in instruction 406, that characters "Z" and "W" need to be represented in frutiger font to produce the webpage. As such, when producing a font subset request (e.g., request 318 shown in FIG. 3), the agent identifies each of the unique characters (i.e., "A", "B", "C", "D", "Z" and "W") and the corresponding font (i.e., frutiger) needed to produce the webpage. In some arrangements, while scanning the content of the file, the agent may come across characters that are not to be included in a font subset request. For example, the HTML file may include an instance in which locally stored fonts on the computer system (executing the file) are to be used for representing particular characters. As such, fonts do not need to be attained from sources external to the computer system. Instruction 408 of the exemplary HTML file 400 illustrates such an occurrence. In this instance, the characters "M", "P" and "Q" are called out by the instruction 408 without a URL for a particular font. As such, fonts local to the computer system executing the file 400 may be used to present the characters "M", "P" and "Q". Since a font or font subset is not needed for these particular characters, the agent does not include these characters in the request 318. However, while these characters are stored locally for this particular font, one or more of these characters may be included in the request for another font based upon another instruction (not shown) in the file 400 that calls out "M", "P" and/or "Q" as being needed in a font attained from a source external to the computer system.

Referring to FIG. 5, one or more techniques may be implemented to analyze the content of a file such as the HTML file 400 (illustrated in FIG. 4) to identify characters for font subsets. For a JavaScript based agent, a browser independent library (referred to as jQuery and which emphasizes interactions between JavaScript and HTML), may be used to analyze text content. To provide this functionality, a jQuery framework may be used to provide an agent for extracting unique characters from a string. The jQuery framework may also include an associative array (referred to as a JSON) for forming associations between the identified unique characters and a corresponding font. Stepping through the file in an iterative manner, the unique characters are identified and stored (e.g., cached) for further processing. The portion of code 500 presented in the figure can provide this functionality.

Referring to FIG. 6, upon identifying the unique characters, one or more techniques may be implemented to group the identified characters accordingly based upon font. For example, each unique character (e.g., "A", "B", "C", "D", "Z" and "W") identified for a particular font (e.g., frutiger) is a member of a group for that font. Additionally, for fonts that have relatively few members (e.g., a font associated with the Latin language), a group of unique characters may not be formed. For such fonts that include relatively fewer members, the entire font set may be sent without consuming considerable computational resources such as transfer time and bandwidth. As such, the complete font set be provided (e.g., from the font provider) for producing characters of that font. The portion of code 600 presented in the figure can provide this functionality.

Referring to FIG. 7, once the identified unique characters for each font have been grouped (along with any identified fonts that have relatively small character sets), the agent provides this information to the font provider 214 (e.g., to the server 222 of the font provider). One or more techniques may be used to provide this information. For example, a command such as the HTTP GET command may be used to append identified characters and corresponding fonts to a URL query string. Upon receiving a request (provided by the HTTP GET command), the font provider 214 (e.g., the server 222 of the font provider) creates and sends one or more appropriate font subsets to the requesting computer system. Complete font sets may also be sent for identified fonts that include relatively few characters, based upon predefined rules associated with one or more factors (e.g., geographic location of user and/or font provider, temporal information, data transfer parameters such as achievable transfer rate, etc.). To provide the identified unique characters and corresponding fonts, a portion of code 700 is presented in the figure that can provide this functionality.

Figure 8:
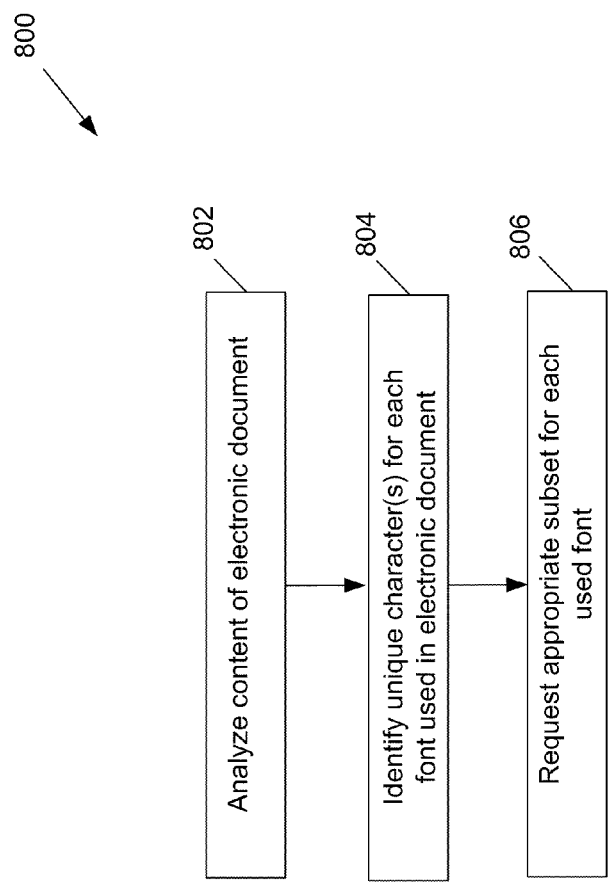
FIG. 8 is an example flow chart of operations of a software agent.

Referring to FIG. 8, a flowchart 800 represents operations of a software agent (e.g., the software agent 212 shown in FIG. 2). Operations of the agent 212 are typically executed by a single computing device (e.g., computer system 202), however, operations of the agent may be executed by multiple computing devices. Along with being executed at a single site (e.g., at one computer system), operation execution may be distributed among two or more locations.

Typically, the agent is requested by the user computing device (e.g., from code included in a file such as an HTML file) and provided from an external source such as the font provider 214. Upon being received and executed by the user computing device, operations may include analyzing 802 the content of an electronic document such as the HTML file that included the instructions to request the software agent. By using a software agent, the content of the electronic document is analyzed in a relatively autonomous and persistent manner. One or more techniques may be implemented to analyze the electronic documents, for example, the agent may step through the document and associate each included character with a corresponding font. Operations may also include identifying 804 each unique character that is associated with a font. For example, while a document may include many instances of the character "a" for a particular font (e.g., Times New Roman), the agent may filter the many instances down to a single instance such that the character "a" is only requested once for the Times New Roman font. Character identification may also include identifying fonts that have relatively small character sets. As such, entire character sets may be requested if one or more of the characters (included in these fonts) are used in the electronic document. Operations may also include requesting 806 appropriate subsets for each font represented in the electronic document. The requested subsets typically include the identified unique characters for each corresponding font. However, for instances in which the font includes relatively few characters, the requested subset may include the entire character set for such a font.

Figure 9:
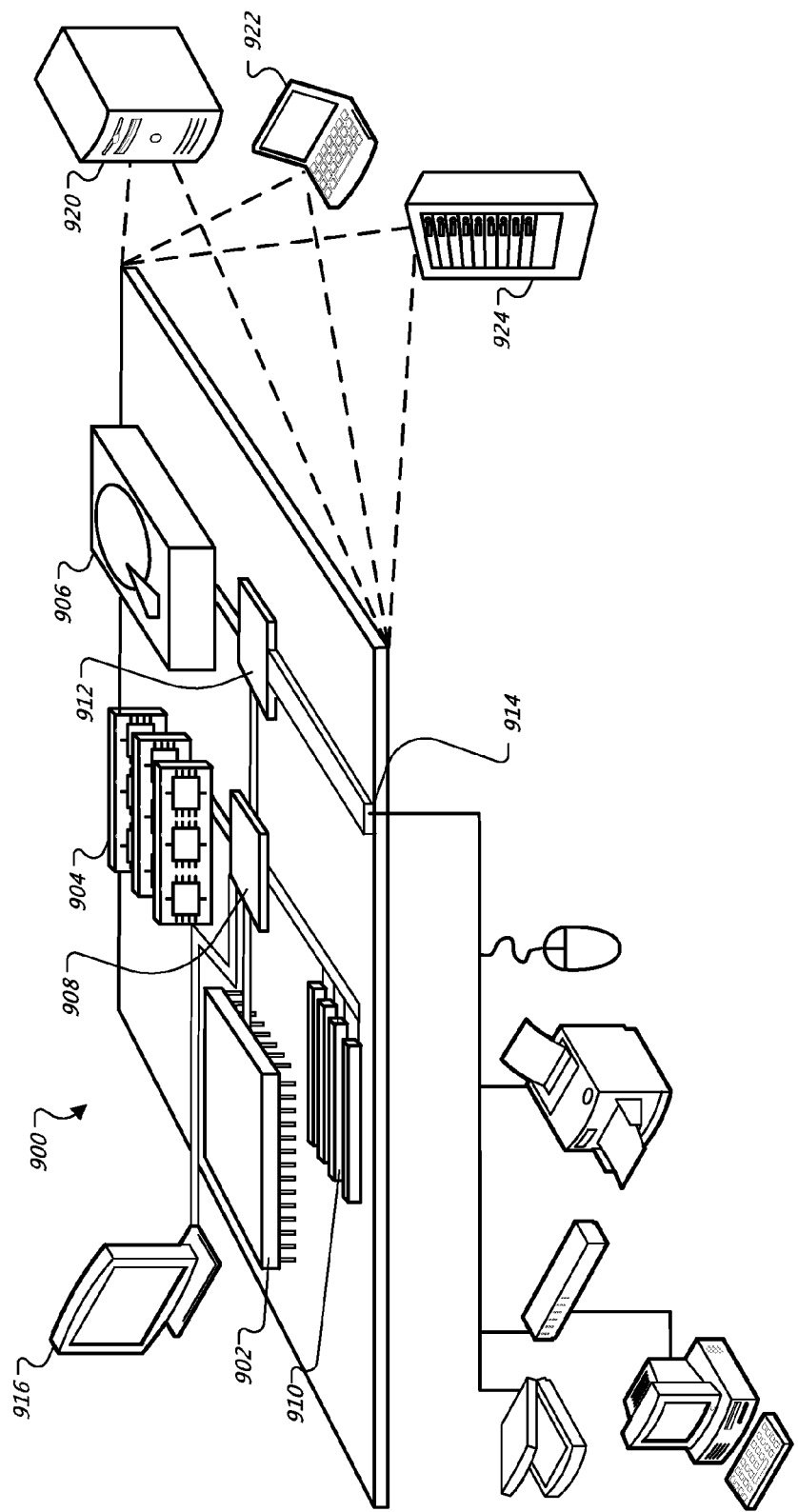
FIG. 9 is a block diagram of computing devices and systems.

FIG. 9 is a block diagram of computing systems 900 that may be used and implemented to perform operations associated with the agent 212. The computing systems may also be used by the font provider 214 to execute operations. Computing device 900 is intended to represent various forms of digital computers, such as laptops, desktops, workstations, personal digital assistants, servers, blade servers, mainframes, and other appropriate computers.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, memory on processor 902, or the like.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 907, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    analyzing content of a received electronic document in an autonomous manner, by a requested agent, to identify each unique character of one or more fonts included in the content of the electronic document;
    initiating a request for a subset of one or more of the fonts included in the content of the electronic document, wherein the request includes each identified unique character of the respective one or more fonts; and
    receiving the subset of the one or more fonts, or, the subset of the one or more fonts and additional characters, inclusion of the additional characters being based upon a data transfer threshold.

2. The computer-implemented method of claim 1 in which analyzing the content of the electronic document includes identifying a source of a font included in the one or more fonts.

3. The computer-implemented method of claim 1 in which analyzing the content of the electronic document includes identifying the absence of a source of a font included in the one or more fonts.

4. The computer-implemented method of claim 1 in which analyzing content of a received electronic document in an autonomous manner is initiated by executing the agent.

5. The computer-implemented method of claim 1 in which analyzing content of the received electronic document includes parsing the content of the electronic document to identify the characters represented in the document.

6. The computer-implemented method of claim 5 in which analyzing content of the received electronic document includes filtering the identified characters represented in the electronic document to identify each unique character for each of the one or more fonts included in the content of the electronic document.

7. The computer-implemented method of claim 1 in which initiating a request for a subset of one or more of the fonts includes adding the identified characters to a request.

8. The computer-implemented method of claim 1 in which a response to the request includes all characters of one of the fonts.

9. The computer-implemented method of claim 1 in which analyzing the content of the electronic document is performed independent of platform.

10. The method of claim 1 in which the data transfer threshold represents a file size threshold.

11. The method of claim 1 in which the data transfer threshold accounts for an entire character set for at least one of the fonts.

12. The method of claim 1 wherein the data transfer threshold is adjustable based on at least one of an achievable file transfer rate, geographic location and temporal factors.

13. A system comprising:
    a font server device for providing to a computing device, upon request, an agent for analyzing content of an electronic document received by the computing device, wherein the analysis performed by the agent identifies each unique character of one or more fonts included in the content of the electronic document;
    wherein the font server is configured to produce, upon request from the computing device, a subset for one or more of the fonts in which each font subset includes each identified unique character of the respective font; and
    wherein the font server is further configured to initiate sending each font subset to the computing device, or, each font subset and additional characters to the computing device, inclusion of the additional characters being based upon a data transfer threshold.

14. The system of claim 13 in which by analyzing the content of the received electronic document, the agent identifies a source of a font included in the one or more fonts.

15. The system of claim 13 in which by analyzing the content of the received electronic document, the agent identifies the absence of a source of a font included in the one or more fonts.

16. The system of claim 13 in which the computing device executes the agent received from the font server to analyze the content of the received electronic document.

17. The system of claim 13 in which the agent parses the content of the electronic document to identify the characters represented in the document.

18. The system of claim 17 in which the agent filters the identified characters represented in the document to identify each unique character for each of the one or more fonts included in the content of the electronic document.

19. The system of claim 13 in which the agent initiates production of the request for the font server.

20. The system of claim 13 in which the agent is configured to operate independent of the computing device type.

21. The system of claim 13 in which the font server is configured to determine the portion of font characters to include in the font subset.

22. The system of claim 21, in which the portion of the font characters to include in the font subset includes all characters of the font.

23. The system of claim 13, in which the font server associates the produced font subset to the received electronic document.

24. A computing device comprising:
    a memory configured to store instructions; and
    a processor configured to execute the instructions to perform a method comprising:
        analyzing content of a received electronic document in an autonomous manner, by a requested agent, to identify each unique character of one or more fonts included in the content of the electronic document;
        initiating a request for a subset of one or more of the fonts included in the content of the electronic document, wherein the request includes each identified unique character of the respective one or more fonts; and receiving the subset of the one or more fonts, or, the subset of the one or more fonts and additional characters, inclusion of the additional characters being based upon a data transfer threshold.

25. The computing device of claim 24, in which analyzing the content of the electronic document includes identifying a source of a font included in the one or more fonts.

26. The computing device of claim 24, in which analyzing the content of the electronic document includes identifying the absence of a source of a font included in the one or more fonts.

27. The computing device of claim 24, in which analyzing content of a received electronic document in an autonomous manner is initiated by executing the agent.

28. The computing device of claim 24, in which analyzing content of the received electronic document includes parsing the content of the electronic document to identify the characters represented in the document.

29. The computing device of claim 28, in which analyzing content of the received electronic document includes filtering the identified characters represented in the electronic document to identify each unique character for each of the one or more fonts included in the content of the electronic document.

30. The computing device of claim 24, in which initiating a request for a subset of one or more of the fonts includes adding the identified characters to a request.

31. One or more computer readable storage devices storing instructions that are executable by a processing device, and upon such execution cause the processing device to perform operations comprising:

analyzing content of a received electronic document in an autonomous manner, by a requested agent, to identify each unique character of one or more fonts included in the content of the electronic document;

initiating a request for a subset of one or more of the fonts included in the content of the electronic document, wherein the request includes each identified unique character of the respective one or more fonts; and receiving the subset of the one or more fonts, or, the subset of the one or more fonts and additional characters, inclusion of the additional characters being based upon a data transfer threshold.

32. The one or more computer readable storage devices of claim 31, in which analyzing the content of the electronic document includes identifying a source of a font included in the one or more fonts.

33. The one or more computer readable storage devices of claim 31, in which analyzing the content of the electronic document includes identifying the absence of a source of a font included in the one or more fonts.

34. The one or more computer readable storage devices of claim 31, in which analyzing content of a received electronic document in an autonomous manner is initiated by executing the agent.

35. A system comprising:

a font server device for producing, upon a request from a computing device, a subset of one or more fonts, wherein each font subset includes each unique character of the respective font as identified from content of an electronic document by a requested agent included in the computing device; and wherein the font server is configured to initiate sending each font subset to the computing device, or, each font subset and additional characters to the computing device, inclusion of the additional characters being based upon a data transfer threshold.

36. The system of claim 35 in which the font server is configured to provide the agent to the computing device.

37. The system of claim 35 in which the agent analyzes the content of the electronic document to identify a source of a font included in the one or more fonts.

38. The system of claim 35 in which the agent analyzes the content of the received electronic document to identify the absence of a source of a font included in the one or more fonts.

39. The system of claim 35 in which the agent parses the content of the electronic document to identify the characters represented in the document.

40. The system of claim 39 in which the agent filters the identified characters represented in the electronic document to identify each unique character for each of the one or more fonts included in the content of the electronic document.

41. The system of claim 35 in which the agent initiates production of the request for the font server.

42. The system of claim 35 in which the agent is configured to operate independent of the computing device type.

43. The system of claim 35 in which the font server is configured to determine the portion of font characters to include in the font subset.

44. The system of claim 43, in which the portion of the font characters to include in the font subset includes all characters of the font.

45. The system of claim 35, in which the font server associates the produced font subset to the electronic document.

* * * * *